United States Patent
Yoshida

(10) Patent No.: US 11,724,388 B2
(45) Date of Patent: Aug. 15, 2023

(54) ROBOT CONTROLLER AND DISPLAY DEVICE USING AUGMENTED REALITY AND MIXED REALITY

(71) Applicant: FANUC CORPORATION, Yamanashi (JP)

(72) Inventor: Nobuhiro Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 507 days.

(21) Appl. No.: 16/589,186

(22) Filed: Oct. 1, 2019

(65) Prior Publication Data
US 2020/0101599 A1 Apr. 2, 2020

(30) Foreign Application Priority Data
Oct. 2, 2018 (JP) .................................. 2018-187680

(51) Int. Cl.
*B25J 9/16* (2006.01)
*G06T 19/00* (2011.01)

(52) U.S. Cl.
CPC ............. *B25J 9/161* (2013.01); *B25J 9/1671* (2013.01); *B25J 9/1674* (2013.01); *G06T 19/006* (2013.01); *G05B 2219/39451* (2013.01)

(58) Field of Classification Search
CPC ...... B25J 9/1671; B25J 9/1605; B25J 9/0081; B25J 9/1664; B25J 9/161; B25J 9/1674; G05B 2219/39451; G05B 2219/39449; G05B 2219/32014; G06T 19/006; G06T 7/70; G06T 7/07; A61B 2090/365
See application file for complete search history.

(56) References Cited

U.S. PATENT DOCUMENTS

| 9,393,699 B1 * | 7/2016 | Jules | B25J 9/1656 |
| 9,916,506 B1 | 3/2018 | Davis | |
| 9,919,427 B1 * | 3/2018 | Guilbert | B25J 9/1664 |

(Continued)

FOREIGN PATENT DOCUMENTS

| DE | 10063089 C1 | 7/2002 |
| DE | 102016224774 B3 | 1/2018 |

(Continued)

*Primary Examiner* — Khoi H Tran
*Assistant Examiner* — Tanner L Cullen
(74) *Attorney, Agent, or Firm* — Hauptman Ham, LLP

(57) ABSTRACT

A robot controller configured to assist an operation of a user, by effectively utilizing both techniques of augmented reality and mixed reality. The robot controller includes: a display device configured to display information generated by a computer so that the information is overlapped with an actual environment, etc.; a position and orientation obtaining section configured to obtain relative position and orientation between the display device and a robot included in the actual environment; a display controlling section configured to display a virtual model of the robot, etc., on the display device; an operation controlling section configured to operate the virtual model displayed on the display device; and a position and orientation determining section configured to determine the position and/or orientation of the robot by using the position and/or orientation of the operated virtual model and using the relative position and orientation between the robot and the display device.

17 Claims, 12 Drawing Sheets

(56) References Cited

U.S. PATENT DOCUMENTS

| | | | |
|---|---|---|---|
| 10,414,046 B1* | 9/2019 | Morey | B25J 9/08 |
| 2004/0046711 A1 | 3/2004 | Triebfuerst | |
| 2016/0158937 A1* | 6/2016 | Kamoi | B25J 9/1671 |
| | | | 700/259 |
| 2016/0288318 A1* | 10/2016 | Nakazato | B25J 9/1666 |
| 2017/0203438 A1 | 7/2017 | Guerin et al. | |
| 2017/0372139 A1* | 12/2017 | Thomasson | G06V 20/20 |
| 2018/0029232 A1* | 2/2018 | Ouchi | B25J 9/1671 |
| 2018/0250822 A1* | 9/2018 | Shimodaira | B25J 9/1697 |
| 2018/0267314 A1 | 9/2018 | Shibasaki | |
| 2019/0088162 A1* | 3/2019 | Meglan | G09B 9/00 |
| 2019/0122435 A1* | 4/2019 | Prideaux-Ghee | G06T 15/20 |
| 2021/0042992 A1* | 2/2021 | Newman | G06T 15/205 |
| 2021/0154826 A1* | 5/2021 | Watanabe | B25J 13/06 |
| 2021/0170603 A1* | 6/2021 | Kotlarski | B25J 9/1697 |

FOREIGN PATENT DOCUMENTS

| | | | | |
|---|---|---|---|---|
| JP | 2004-209641 A | 7/2004 | | |
| JP | 2012-171024 A | 9/2012 | | |
| JP | 2014180707 A | 9/2014 | | |
| JP | 2016-107379 A | 6/2016 | | |
| JP | 2017-104944 A | 6/2017 | | |
| JP | 2017-138609 A | 8/2017 | | |
| JP | 2017-523054 A | 8/2017 | | |
| JP | 201998513 A | 6/2019 | | |
| WO | WO-2019046559 A1 * | 3/2019 | | B25J 13/00 |
| WO | WO-2019120481 A1 * | 6/2019 | | G05B 19/4086 |

* cited by examiner

ROBOT CONTROLLER AND DISPLAY DEVICE USING AUGMENTED REALITY AND MIXED REALITY

RELATED APPLICATIONS

The present application claims priority of Japanese Application Number 2018-187680, filed Oct. 2, 2018, the disclosure of which is hereby incorporated by reference herein in its entirety.

BACKGROUND OF THE INVENTION

1. Field of the Invention

The preset invention relates to a robot controller and a display device, which use augmented reality and mixed reality.

2. Description of the Related Art

In a robot system of the prior art, a status of a robot or a work of an operator may be navigated by using a technique regarding virtual reality (VR). However, in the virtual reality, it is necessary to previously provide model data, etc., of the robot and peripheral equipment thereof, and it takes considerable time and effort to create precise models. Further, when the virtual model of the robot is significantly different from the actual robot, the navigation cannot be correctly carried out.

Therefore, in a recent robot system, a technique regarding augmented reality (AR) (for example, an AR-compatible display) is used, in order to display the status of the robot or assist (or navigate) the work of the operator (e.g., see JP 2016-107379 A, JP 2017-138609 A, JP 2012-171024 A, JP 2017-104944 A, JP 2004-209641 A and JP 2017-523054 A).

When an operation such as a teaching of the robot should be carried out, the operator can carry out the operation while looking an image or information overlapped with the actual robot. However, when carrying out the teaching, etc., it is necessary to move the actual robot, similarly to the conventional technique. Therefore, the operation using the conventional AR technique is not sufficiently user-friendly, and thus a technique to assist the operation of the operator is required, by effectively utilizing merits of both the augmented reality and mixed reality (MR).

SUMMARY OF THE INVENTION

One aspect of the present disclosure is a robot controller comprising: a display device configured to display information generated by a computer so that the information is overlapped with an actual environment or an actual image obtained by capturing the actual environment; a position and orientation obtaining section configured to obtain relative position and orientation between the display device and a robot included in the actual environment; a display controlling section configured to control the display device so that the display device displays a virtual model of at least one object of the robot, a movable part of the robot, an article supported by the movable part, and a work target of the movable part; an operation controlling section configured to operate the virtual model displayed on the display device; and a position and orientation determining section configured to determine at least one of the position and orientation of the robot by using at least one of the position and orientation of the virtual model operated by the operation controlling section, and using the relative position and orientation obtained by the position and orientation obtaining section.

Another aspect of the present disclosure is a robot controller comprising: a display device configured to display information generated by a computer so that the information is overlapped with an actual environment or an actual image obtained by capturing the actual environment; a display controlling section configured to control the display device so that the display device displays a virtual model of at least one object of a robot included in the actual environment, a movable part of the robot, an article supported by the movable part, and a work target of the movable part; an operation controlling section configured to operate the virtual model displayed on the display device; and a position and orientation obtaining section configured to obtain at least one of relative position and orientation between the robot and the display device by using at least one of the position and orientation of the object included in the actual environment or at least one of the position and orientation of the virtual model displayed on the display device in the case where the object included in the actual environment and the virtual model displayed on the display device are matched to each other, or the object and the virtual model represented in the actual image on the display device are matched to each other.

Still another aspect of the present disclosure is a display device comprising: a displaying section configured to display information generated by a computer so that the information is overlapped with an actual environment or an actual image obtained by capturing the actual environment; a position and orientation obtaining section configured to obtain relative position and orientation between the displaying section and a robot included in the actual environment; a display controlling section configured to control the displaying section so that the displaying section displays a virtual model of at least one object of the robot, a movable part of the robot, an article supported by the movable part, and a work target of the movable part; an operation controlling section configured to operate the virtual model displayed on the displaying section; and a position and orientation determining section configured to determine at least one of the position and orientation of the robot by using at least one of the position and orientation of the virtual model operated by the operation controlling section, and using the relative position and orientation obtained by the position and orientation obtaining section.

A further aspect of the present disclosure is a display device comprising: a display section configured to display information generated by a computer so that the information is overlapped with an actual environment or an actual image obtained by capturing the actual environment; a display controlling section configured to control the displaying section so that the displaying section displays a virtual model of at least one object of a robot included in the actual environment, a movable part of the robot, an article supported by the movable part, and a work target of the movable part; an operation controlling section configured to operate the virtual model displayed on the displaying section; and a position and orientation obtaining section configured to obtain at least one of relative position and orientation between the robot and the displaying section by using at least one of the position and orientation of the object included in the actual environment or at least one of the position and orientation of the virtual model displayed on the displaying section in the case where the object included in the actual environment and the virtual model displayed on the displaying section are matched to each other, or the object and the virtual model represented in the actual image on the displaying section are matched to each other.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
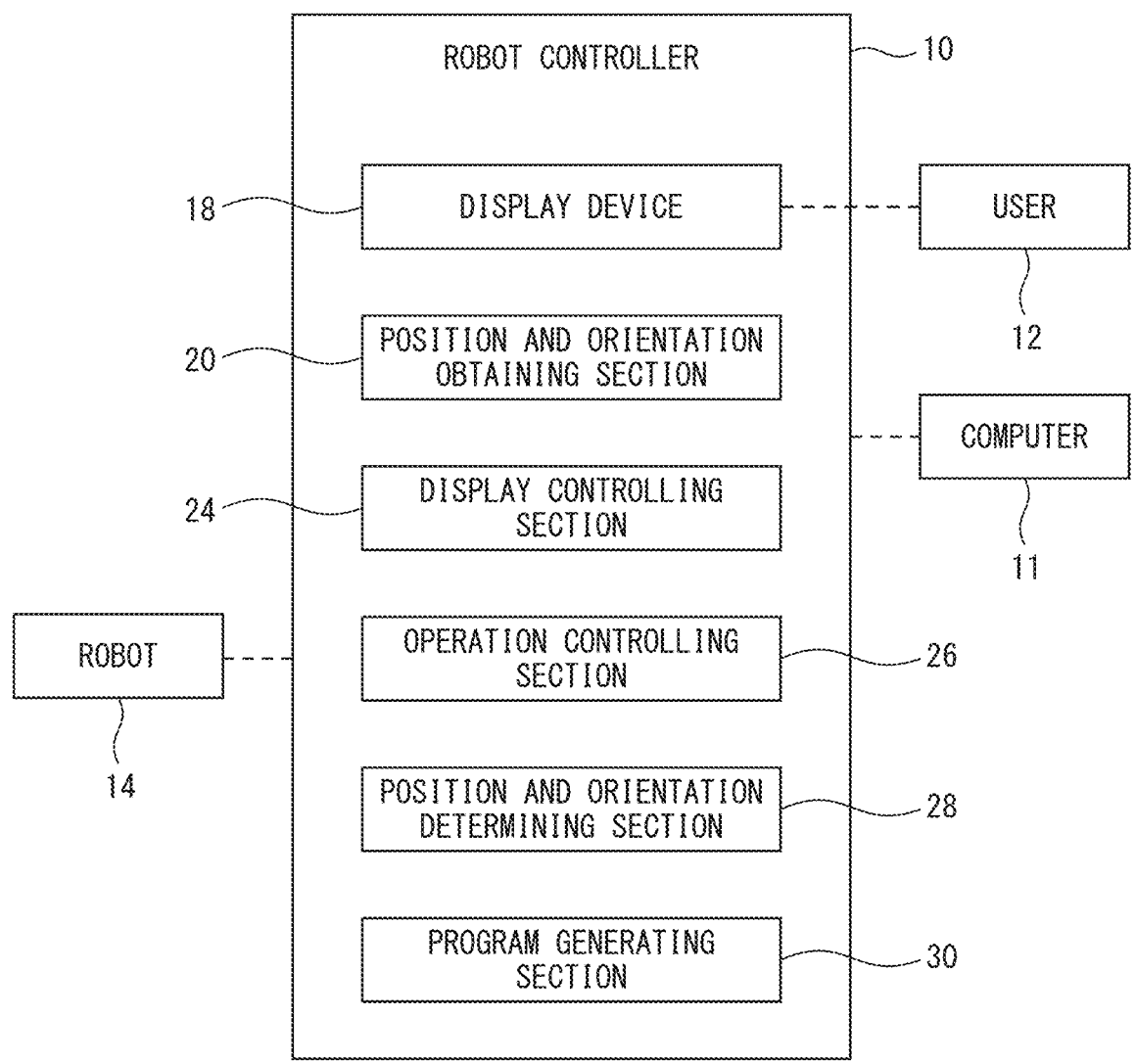
FIG. 1 is a functional block diagram of a robot controller according to a preferred embodiment.
Figure 2:
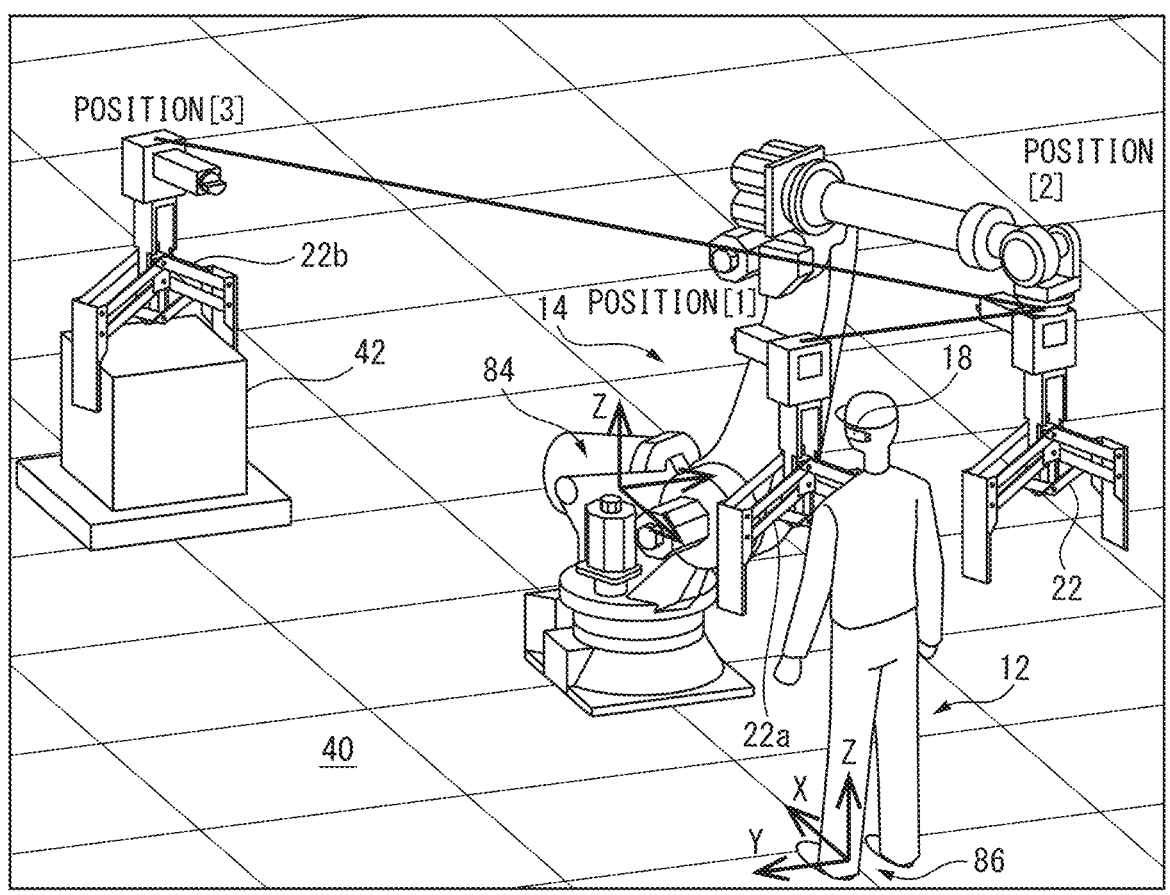
FIG. 2 shows a state in which a user carries out teaching of a robot.

FIG. 1 is a functional block diagram of a robot controller 10 according to a preferred embodiment, and FIG. 2 exemplifies an application of robot controller 10, in which an operator (user) 12 carries out teaching of a robot 14. Robot controller 10 includes: a display device 18 configured to display information (a 3D-model, etc.) generated by a computer 11 so that the information is overlapped with an actual environment (a factory or a work site, etc.) including robot 14 or an (actual) image obtained by capturing the actual environment; a position and orientation obtaining section 20 configured to obtain relative position and orientation (or a positional relationship) between display device 18 and robot 14 included in the actual environment; a display controlling section 24 configured to control display device 18 so that display device 18 displays a (virtual) model of a movable part (e.g., a robot arm and a tool attached to the arm, etc.) 22 of robot 14; an operation controlling section 26 configured to operate the virtual model displayed on display device 18; and a position and orientation determining section 28 configured to determine at least one of the position and orientation (e.g., a teaching point) of robot 14 by using at least one of the position and orientation of the virtual model operated by operation controlling section 26 and using the positional relationship obtained by position and orientation obtaining section 20. Further, robot controller 10 may include a program generating section 30 configured to generate a motion program of robot 14 by using at least one of the position and orientation of robot 14 determined by position and orientation determining section 28.

The movable part herein means an object capable of being moved by the motion of each axis of the robot. For example, the movable part may include the robot arm, and/or a hand or a tool attached to the end of the arm, etc. Further, the virtual model may include at least one object of a robot (such as robot 14) included in the actual environment, the movable part of the robot, an article supported by the movable part of the robot, and a work target of the movable part. In addition, the work target may include an article used in a calibration operation of the robot (e.g., an article to which the movable part of the robot contacts during the calibration operation), as well as an article (or a workpiece) to be conveyed, processed or machined, etc., by the robot.

In the example of FIG. 1, orientation obtaining section 20, display controlling section 24, operation controlling section 26, position and orientation determining section 28 and program generating section 30 may be realized by a CPU, a memory, a sensor, a communication device capable of radio communication with display device 18, or a combination thereof, which are arranged in a case (not shown) connected to robot 14 by wire or wireless. In this regard, at least one of those components may be arranged in display device 18. In other words, display device 18 may include orientation obtaining section 20, display controlling section 24, operation controlling section 26, position and orientation determining section 28 and program generating section 30. In addition, display device 18 and the case may have a controlling section (such as a CPU and a memory, etc.) for controlling the whole behavior of display device 18 and robot 14.

Figure 3:
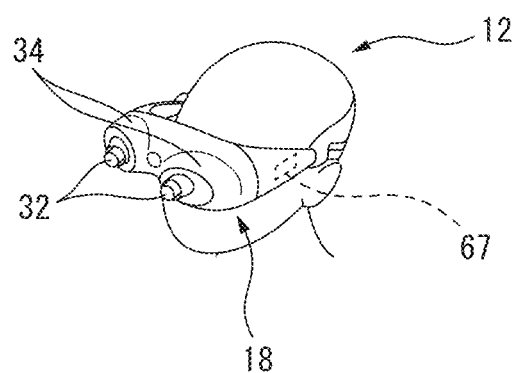
FIG. 3 shows a head-mounted display as an example of a display device.

FIG. 3 shows a head-mounted display as a concrete example of display device 18. Head-mounted display 18 has a camera 32 for capturing the actual environment, and a display 34 for displaying an image or picture obtained (captured) by camera 32 in real-time. Display 34 is an example of the displaying section. User 12 can wear head-mounted display 18 and direct camera 32 thereof toward actual robot 14, so that the environment including robot 14 can be imaged and the image of the environment can be obtained (captured) in real-time. By virtue of this, user 12 can look the augmented reality image via display 34. Alternatively, head-mounted display 18 may have a transmissive display, so that user 12 can look the actual environment through the transmissive display. The virtual model displayed on display 34 can be operated (translated, rotated, enlarged, or zoomed in/out) within display 34, by a motion (such as a gesture motion as explained below) of user 12.

Figure 4:
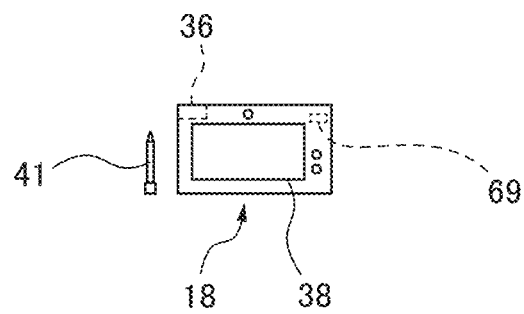
FIG. 4 shows a mobile terminal as an example of a display device.

FIG. 4 shows a mobile terminal (tablet) as another example of display device 18. Mobile terminal 18 has a camera 36 for capturing the actual environment, and a display 38 for displaying an image or picture obtained (captured) by camera 36 in real-time. Display 38 is another example of the displaying section. User 12 can hold mobile terminal 18 and direct camera 36 thereof toward actual robot 14, so that the environment including robot 14 can be imaged and the image of the environment can be obtained (captured) in real-time. By virtue of this, user 12 can look the augmented reality image via display 38. The virtual model displayed on display 38 can be operated (moved, etc.) by the user by contacting or sliding a finger or a stylus pen 41, etc., within display 38.

Next, an example of the procedure of the operation or process using robot controller 10 will be explained. Herein, as shown in FIG. 2, user 12 wears the head-mounted display (as shown in FIG. 3) as display device 18, and teaches the operation in which robot 14 installed on a floor surface 40 in the environment (in this case, a work site) grips an actual article (workpiece) 42 positioned at a predetermined place on floor surface 40, by using a gripping tool (in this case, robot hand 22). Although FIG. 2 shows three hands 22, 22a and 22b, only hand 22 attached to the end of robot 14 is the actual hand, and other hands 22a and 22b are non-existent virtual images (models) as explained below. In addition, a robot body of robot 14 other than hand 22, workpiece 42, and other peripheral equipment (not shown) are actual.

Figure 5:
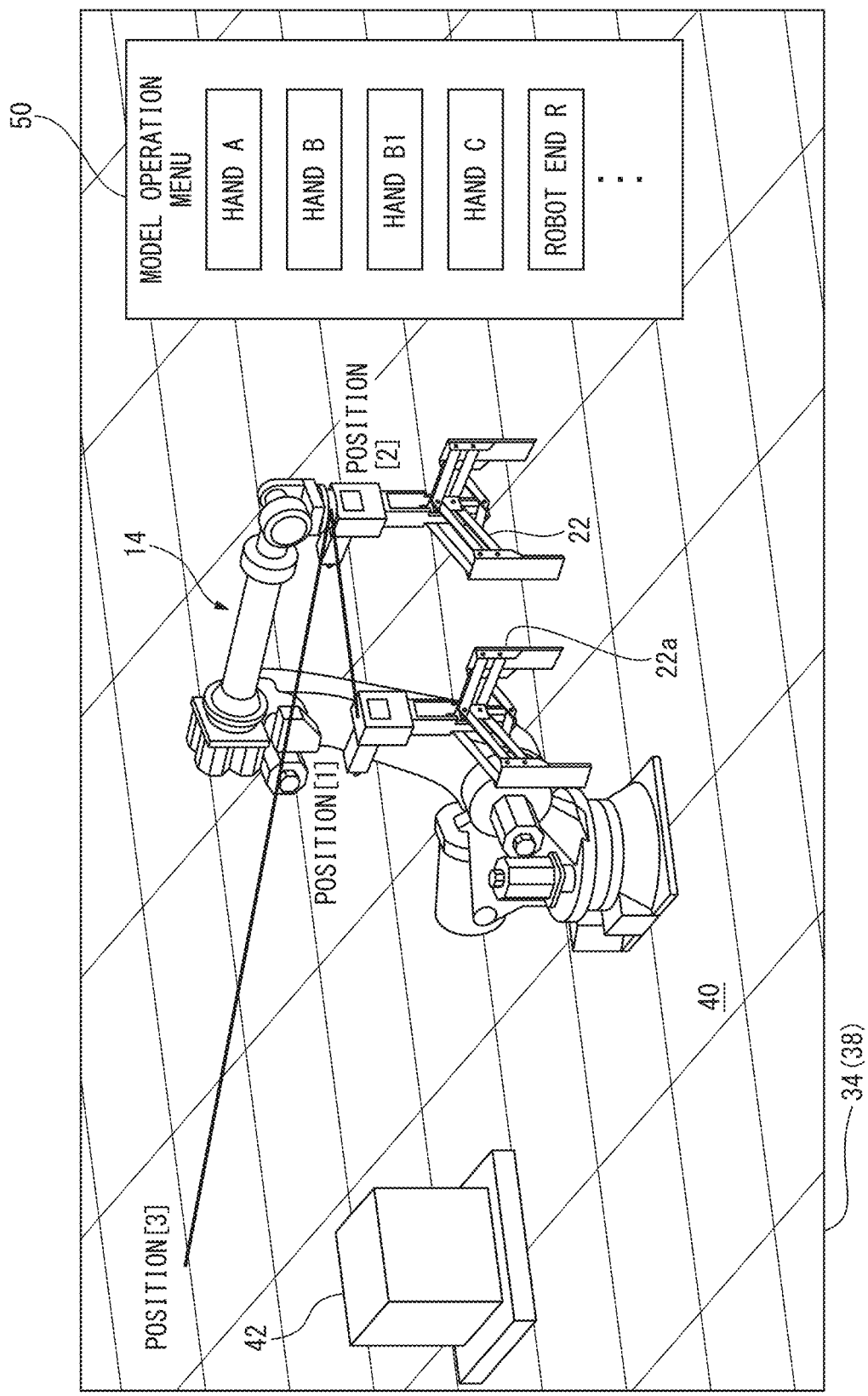
FIG. 5 shows a display example of a display device when the user directs the display device toward the robot.

First, when user 12 directs display device 18 toward robot 14, an image (e.g., a window) 50 representing a list or menu of models, such as a usable tool (e.g., a hand) for robot 14 or the end of robot 14 ("robot end R"), is displayed on display 34 of display device 18, as shown in FIG. 5. Then, user 12 selects a proper model among the displayed models, by a gesture motion (e.g., a drag-and-drop motion), whereby the selected model is displayed at a specified position in a reference coordinate system 86 previously defined at a predetermined position in the actual environment. In this case, user 12 performs the drag-and-drop motion so that "hand B" is moved from menu 50 to the left side of actual hand 22, whereby virtual model 22a of hand 22 is displayed. In this regard, the size of virtual model 22a can be automatically and appropriately changed, depending on the position where the virtual model is dropped.

In menu 50, the selectable tools may be displayed in text form, and/or may be displayed as images. The tool may be displayed as a single item, or may be displayed with an article held by the tool. For example, in menu 50, hand B as the single item may be indicated as "hand B," and hand B gripping workpiece 42 may be indicated as "hand B1." For example, when "hand B1" is selected, the virtual model of hand 22 is displayed while gripping workpiece 42.

Figure 6:
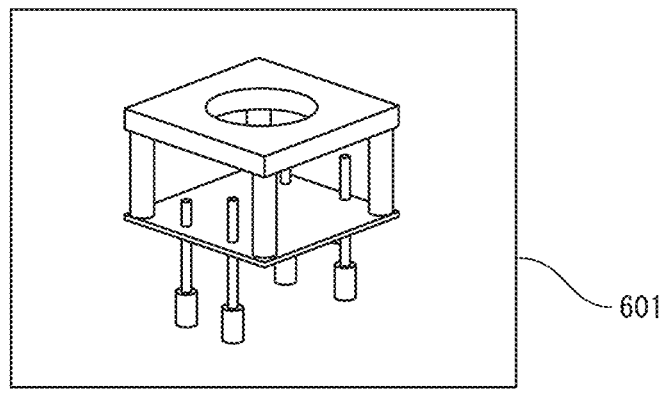
FIG. 6 shows an example of an image of a tool displayed on a menu.
Figure 6:
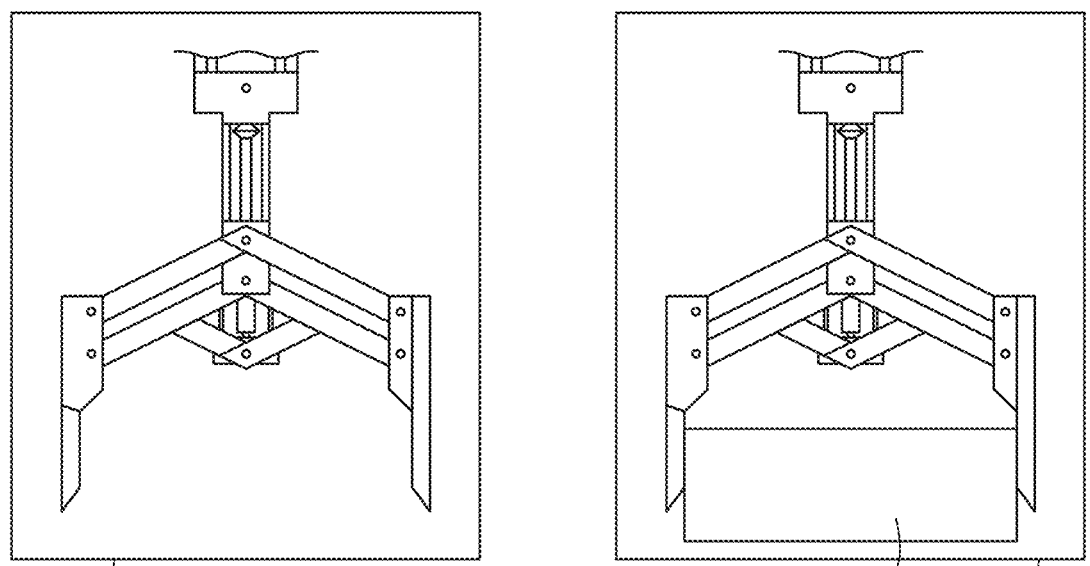
Figure 6:
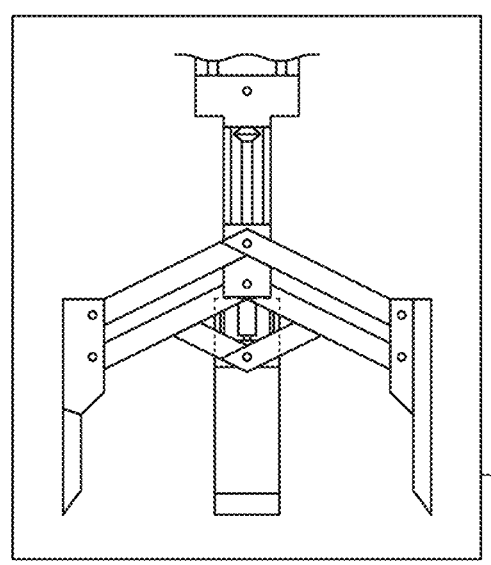

FIG. 6 shows an example of an image of the tool displayed on menu 50. As shown in FIG. 6, images 601 to 604 represent images of "hand A," "hand B," "hand B1" and "hand C," respectively. For example, "hand A" is a tool configured to hold the workpiece by adsorbing it, and "hand B" is a tool having two claws, configured to grip the workpiece by sandwiching it therebetween. As described above, "hand B1" indicates the state in which hand B grips the workpiece. For example, "hand C" is a tool having three claws, configured to grip the workpiece by sandwiching it therebetween.

The listed models may be displayed as three-dimensional (3D) models. As the 3D model, a portion of the robot, a tool (a hand, a welding gun, a sealing gun, etc.) attached to the robot, and an article to be operated by the tool (a workpiece gripped and conveyed by the hand, an object to be welded, etc.) may be displayed.

Figure 7:
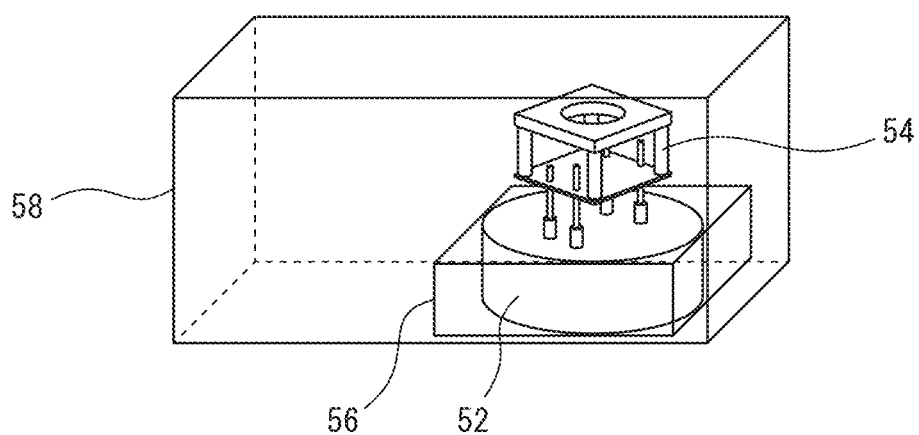
FIG. 7 shows an example of displaying an actual workpiece by using a simple model.

Further, on the menu of models, a virtual object (e.g., a rectangular parallelepiped) defined previously or at the work site by the user may also be displayed. For example, as shown in FIG. 7, an actual workpiece 52 has a cylindrical shape, and an adsorption hand 54 conveys workpiece 52 by adsorbing an upper surface of the workpiece. In such a case, previously or at the work site, user 12 may set and/or store workpiece 52 in robot controller 10, as a rectangular parallelepiped 3D work model 56 which may involve workpiece 52. Then, work model 56 can be displayed on display 34 of display device 18. In this case, although work model 56 is not limited to the rectangular parallelepiped, it is preferable that at least upper and lower surfaces of work model 56 be set so as to coincide with upper and lower surfaces of actual workpiece 52. When the shape of the actual workpiece is complicated or when the actual workpiece cannot be prepared (or cannot be positioned in the environment), an operation (such as teaching as explained below) can be facilitated by using the above model of the workpiece.

As shown in FIG. 7, in case that a teaching in which workpiece 52 is taken into or out from a box 58 should be carried out, when box 58 is actually positioned in the actual environment, the workpiece within the box may not be viewed by the user. In such a case, due to the modeling of the workpiece, an outline of the workpiece can be virtually displayed by a dotted line, etc., by which the user can recognize that the workpiece is hidden in the box. As a result, the user can intuitively and easily carry out the teaching of the robot by using robot controller 10. In normal, when the teaching is to be carried out, the user operates the robot controller so as to execute a motion program of the actual robot, and checks as to whether a conveyance path between teaching points interferes with the actual object. In this checking, the user operates the robot controller so as to execute the program several times, while increasing the velocity of the robot in stages, from a lower velocity to a target teaching velocity. On the other hand, in the embodiment, by carrying out the above modeling of the workpiece before the teaching, the motion of the robot when robot controller 10 executes the robot program can be overlapped with the actual environment, as the virtual image of the robot. Therefore, the user can replay the motion image of work model 56 and can easily check as to whether the robot interferes with the object between the teaching points at the target teaching velocity from the beginning, without considering the interference between the conveyance path of the robot and the actual object such as the box, whereby the teaching time of robot controller 10 can be reduced.

List (or menu) 50 of the models is displayed on a user coordinate system fixed to the body of user 12. In other words, menu 50 is moved so as to follow the motion of user 12, and thus menu 50 is always displayed at a constant position relative to user 12. On the other hand, model 22a, after being displayed (or dropped) so as to overlap with the actual environment, is set with respect to reference coordinate system 86. Therefore, even when user 12 moves, model 22a does not follow the motion of user 12, and is displayed at the specified position in the actual environment.

After virtual model 22a is overlapped with the image of the actual environment as shown in FIG. 5, user 12 performs the motion such as a gesture motion, so that virtual model 22a is positioned at a desired position with a desired orientation. Hereinafter, concrete examples of the gesture motion will be explained.

(Drag Motion)

(A1) User 12 turns his/her own gaze on virtual model 22a attached to hand 22 or the end of the robot, and performs a gesture motion so as to pinch virtual model 22a by fingers. By virtue of this, display controlling section 24 allows model 22a to be moved.

(A2) User 12 moves his/her own hand while pinching virtual model 22a, so as to move model 22a to a position/orientation where the user 12 wants to teach. Display controlling section 24 moves model 22a corresponding to the motion of the hand of user 12. When the distance of movement is relatively long, user 12 may move or walk within the work site (or the actual environment).

(A3) When model 22a reaches the desired position, user 12 performs a gesture motion so as to open his/her own hand. The position and orientation of model 22a at this time is set (or stored in a memory) as a teaching point, etc., by position and orientation determining section 28.

(Drag Motion of the Entire Robot)

Display controlling section 24 controls display device 18 so that (display 34 of) display device 18 displays a virtual model of the entire of robot 14. User 12 may perform the following motion, etc., when user 12 wants to teach by moving the entire model of the robot.

Figure 8:
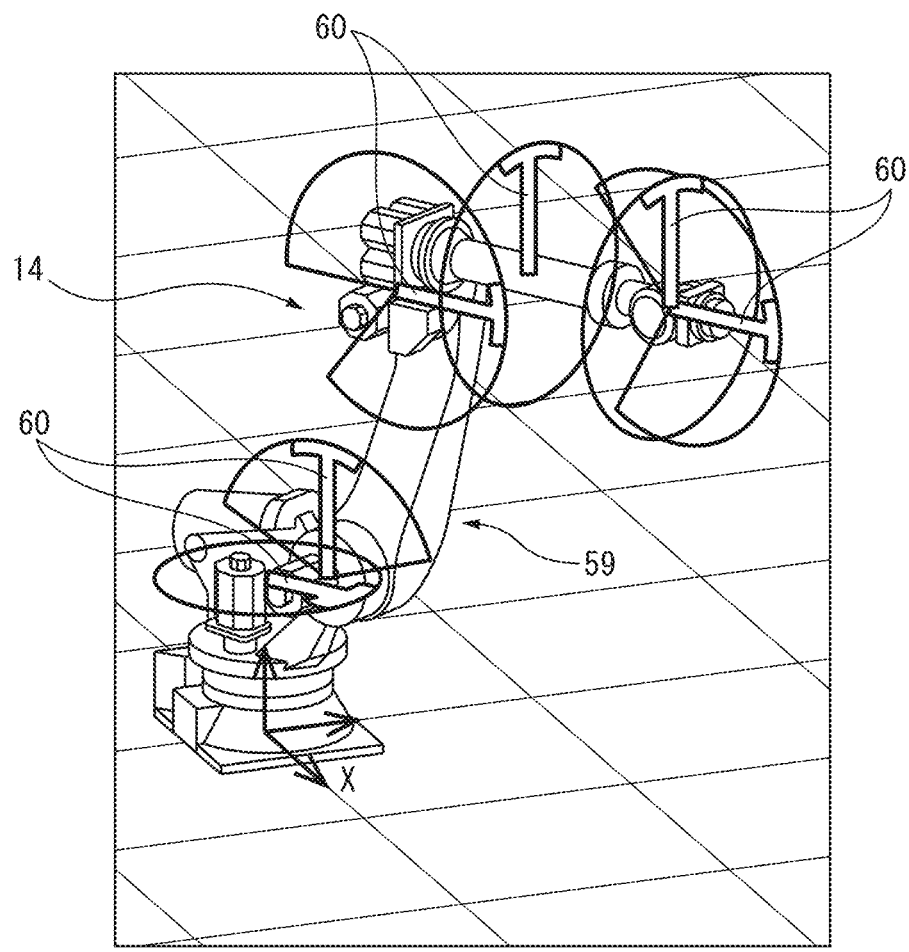
FIG. 8 shows an example of displaying a bar for rotating each axis of the robot on a model of the robot.

(B1) As shown in FIG. 8, User 12 performs a gesture motion, etc., so that a virtual (3D) model 59 of the entire of robot 14 is overlapped with actual robot 14. Then, user 12 turns his/her own gaze on model 59, and performs air-tap motion, whereby a bar 60 for adjusting the position of each axis of the robot is displayed in a space near robot model 59. In this case, robot 14 is a multi-joint robot having six axes, and thus six bars 60 are displayed near the respective axes of model 59.

(B2) User 12 turns his/her own gaze on one (objective) axis, performs an air-tap motion, and then performs the gesture motion so as to pinch bar 60, whereby display controlling section 24 allows model 59 to be moved.

(B3) User 12 moves his/her own hand in a circular motion, while pinching bar 60, so as to move the position of the objective axis of model 59 to a position where the user 12 wants to teach. Display controlling section 24 moves model 59 corresponding to the motion of the hand of user 12. At this time, it is not necessary to move actual robot 14.

(B4) When the objective axis reaches the desired position, user 12 performs a gesture motion so as to open his/her own hand. Then, the position of the objective axis at this time is fixed (or set), by position and orientation determining section 28.

(B5) The processes (B3) and (B4) are executed for the other axes as needed. Finally, user 12 turns his/her own gaze on a portion of the robot other than each axis, and performs the air-tap motion. By virtue on this, the position and orientation of robot model 59 (or the position of each axis) at this time is set as a teaching point.

(Button Operation)

(C1) User 12 turns his/her own gaze on the tool such as hand 22a, and performs the air-tap motion. Then, as exemplified in FIG. 9, in a space near the tool, a tool coordinate system 62 defined for the tool, a plurality of operation buttons 64 for operating the virtual model of the tool, and a jog mode applied to the tool are displayed. For example, "orthogonal" is displayed, which represents that the applied jog mode is an orthogonal jog. As another example of display of the jog mode, "joint" representing a joint jog, or a display of specified coordinate system representing that the jog is an orthogonal jog defined in the specified coordinate system (e.g., "tool", etc., when the jog is defined in the tool coordinate system) may be displayed. In addition, depending on the applied jog mode, the display of operation button 64 may be changed. For example, "+J1", etc., representing the objective axis may be displayed instead of "+X" and "−X", etc., when the orthogonal jog is used. Moreover, the number of displayed operation buttons 64 may be changed, depending on the number of axes and/or additional axis of robot 14.

(C2) User 12 turns his/her own gaze on any one of buttons 64, and performs the air-tap motion, whereby model 22a is moved by a predetermined distance depending on a displayed ratio (in the drawing, 10%) displayed near button 64. When model 22a should be continuously moved, user 12 performs a predetermined motion (e.g., a gesture motion for closing own fist) after user 12 turns his/her own gaze on the objective button. Also in this movement, model 22a is moved with the predetermined velocity depending on the displayed ratio (in the drawing, 10%) displayed near button 64. For example, when the maximum movement velocity (e.g., 250 mm/s) of robot 14 is set as 100% and the displayed ratio is 10%, model 22a is moved with a velocity corresponding to 10% of the maximum velocity (i.e., 25 mm/s) in the designated direction. The same is also applicable to an orthogonal jog operation as explained below. In this case, for example, when the user performs a gesture motion for opening own fist, the movement of model 22a can be stopped. If user 12 wants to change the ratio (%), user 12 may turn his/her own gaze on indication 65 and may perform the air-tap motion, whereby a button (not shown), by which the user can input a numeral, can be displayed.

(C3) When hand 22a or the tool is moved to the position to teach, user 12 turns his/her own gaze on model 22a and performs the air-tap motion. By virtue of this, the position and orientation of model 22a at this time are set (or stored in a memory), and then tool coordinate system 62 and buttons 64 are hidden.

(Orthogonal Jog Operation)

(D1) User 12 turns his/her own gaze on the tool such as hand 22a, and performs the air-tap motion. Then, as exemplified in FIG. 10 or 11, in a space near the tool, an orthogonal jog 66 or 68 for operating the virtual model of the tool, and information 70 or 72 for indicating a ratio of the velocity at which the model is moved, are displayed.

(D2) After user 12 turns his/her own gaze on orthogonal jog 66 and performs the air-tap motion, user 12 can pinch and operate a button 74 of orthogonal jog 66. Then, when user 12 pinches button 74 and moves the button in the desired direction (in the drawing, any one of +X, −X, +Y, −Y, +Z and −Z), the tool can be moved in the desired direction at a designated velocity (e.g., 10% of the maximum velocity). Similarly, after user 12 turns his/her own gaze on orthogonal jog 68 and performs the air-tap motion, user 12 can pinch and operate any one of an X-axis 76, a Y-axis 78 and a Z-axis 80 of orthogonal jog 68. Then, when user 12 rotates the pinched axis in the clockwise or counterclockwise direction, the virtual model such as hand 22a can be rotated in the desired direction (in the drawing, any one of +X, −X, +Y, −Y, +Z and −Z) at the designated velocity.

Figure 9:
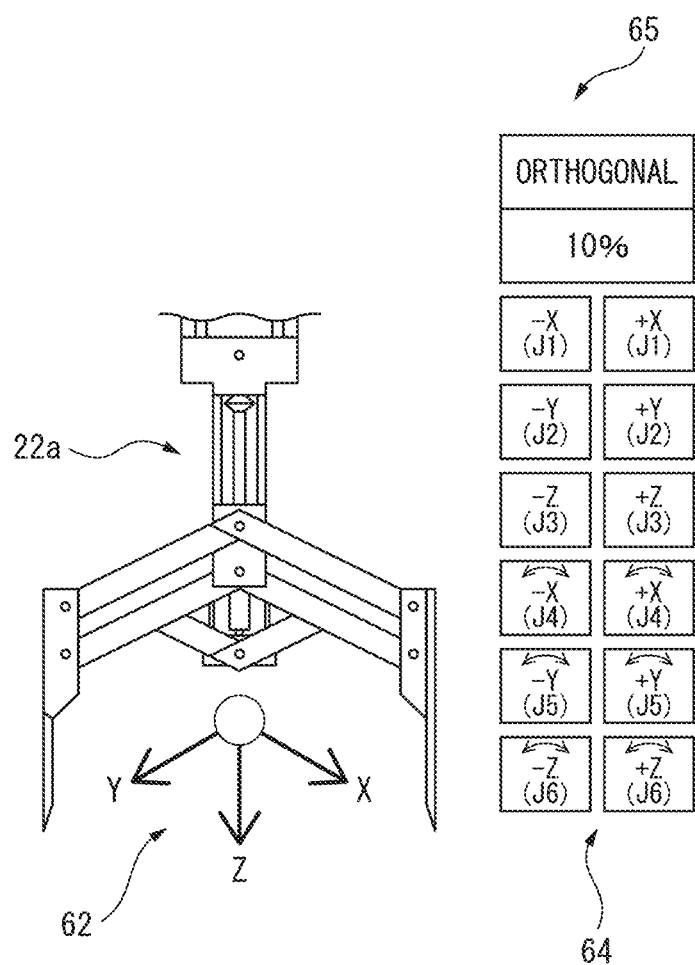
FIG. 9 shows an example of displaying a tool coordinate system and manual operation buttons near a tool model.
Figure 10:
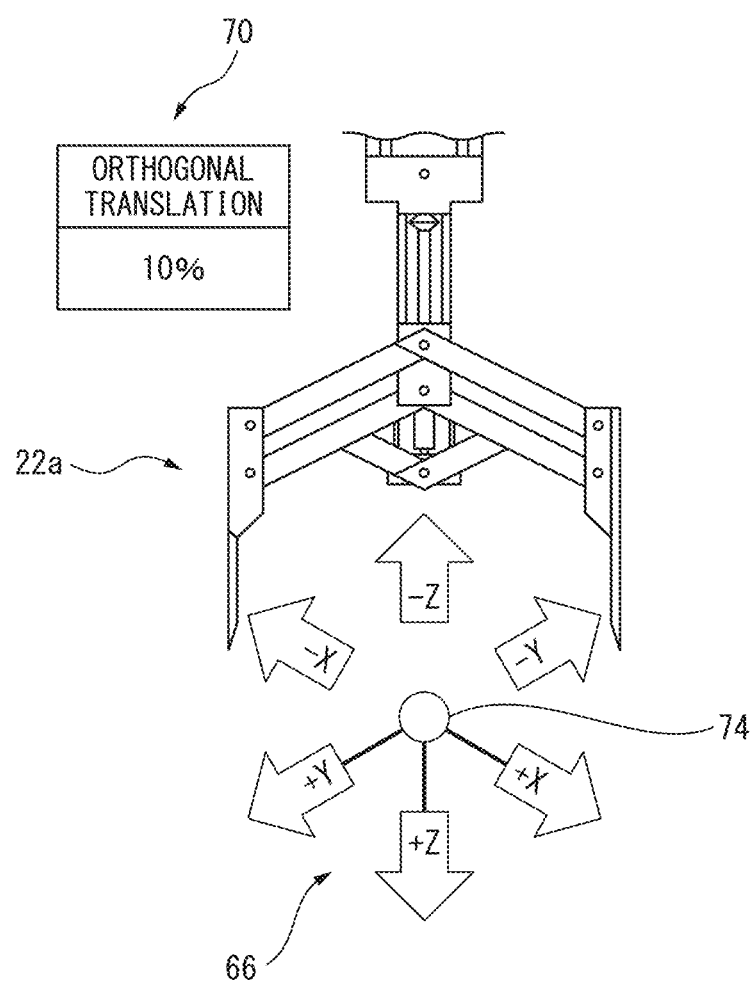
FIG. 10 shows an example of displaying an orthogonal jog for translational movement of the model near the tool model.
Figure 11:
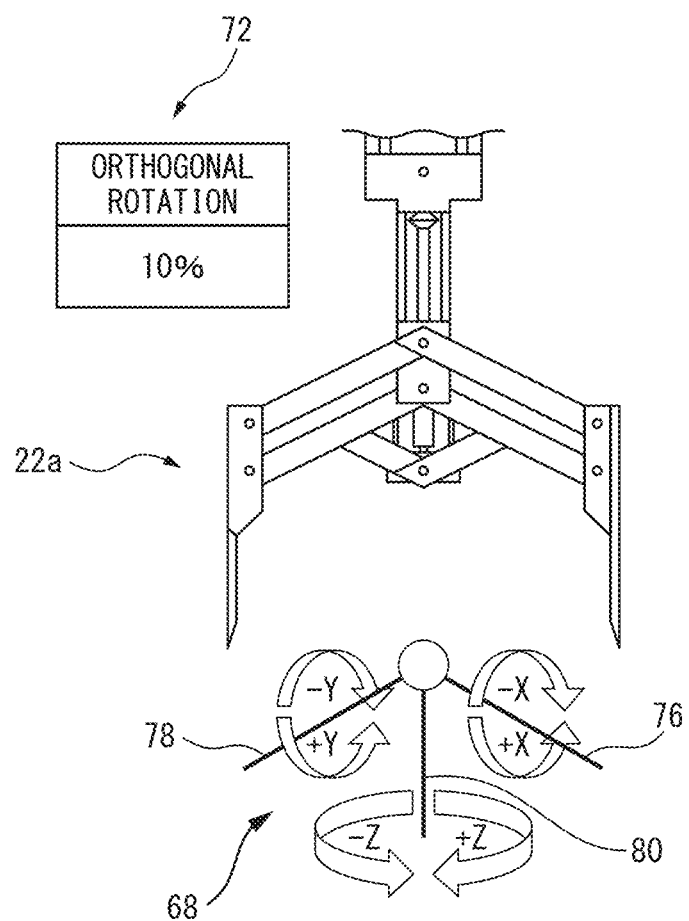
FIG. 11 shows an example of displaying an orthogonal jog for rotational movement of the model near the tool model.

(D3) When hand 22a or the tool is moved to the position to teach, user 12 turns his/her own gaze on model 22a and performs the air-tap motion. By virtue of this, the position and orientation of model 22a at this time are fixed (or temporarily stored), and then orthogonal jog 66 or 68, and information 70 or 72 are hidden. In FIG. 10, button 74 is pinched for operating the tool, and in FIG. 11, any one of X-axis 76, Y-axis 78 and Z-axis 80 is pinched for operating the tool. However, an arrow as shown in FIG. 10 or 11 may be displayed as a button for operating the tool. In such a case, an operation similar to the button operation as shown in FIG. 9 may be performed.

The gaze direction of user 12 can be calculated by using a conventional technique. For example, the gaze direction of user 12 can be calculated by detecting the orientation of display device 18 (i.e., which direction the head of user 12 or camera 36 is facing), by using a sensor 67 such as a gyro sensor (see FIG. 3) provided to head-mounted display 18 or by using a sensor 69 such as a gyro sensor (see FIG. 4) provided to tablet 18.

In the above gesture motion, user 12 may open or close own hand, perform the air-tap, pinch the object with the finger, etc. In this regard, user 12 can perform another gesture motion for operating the model. Further, user 12 can perform an operation other than the gesture motion, by using a teach pendant or a pointing device such as a joystick or a touch panel, etc.

Figure 12:
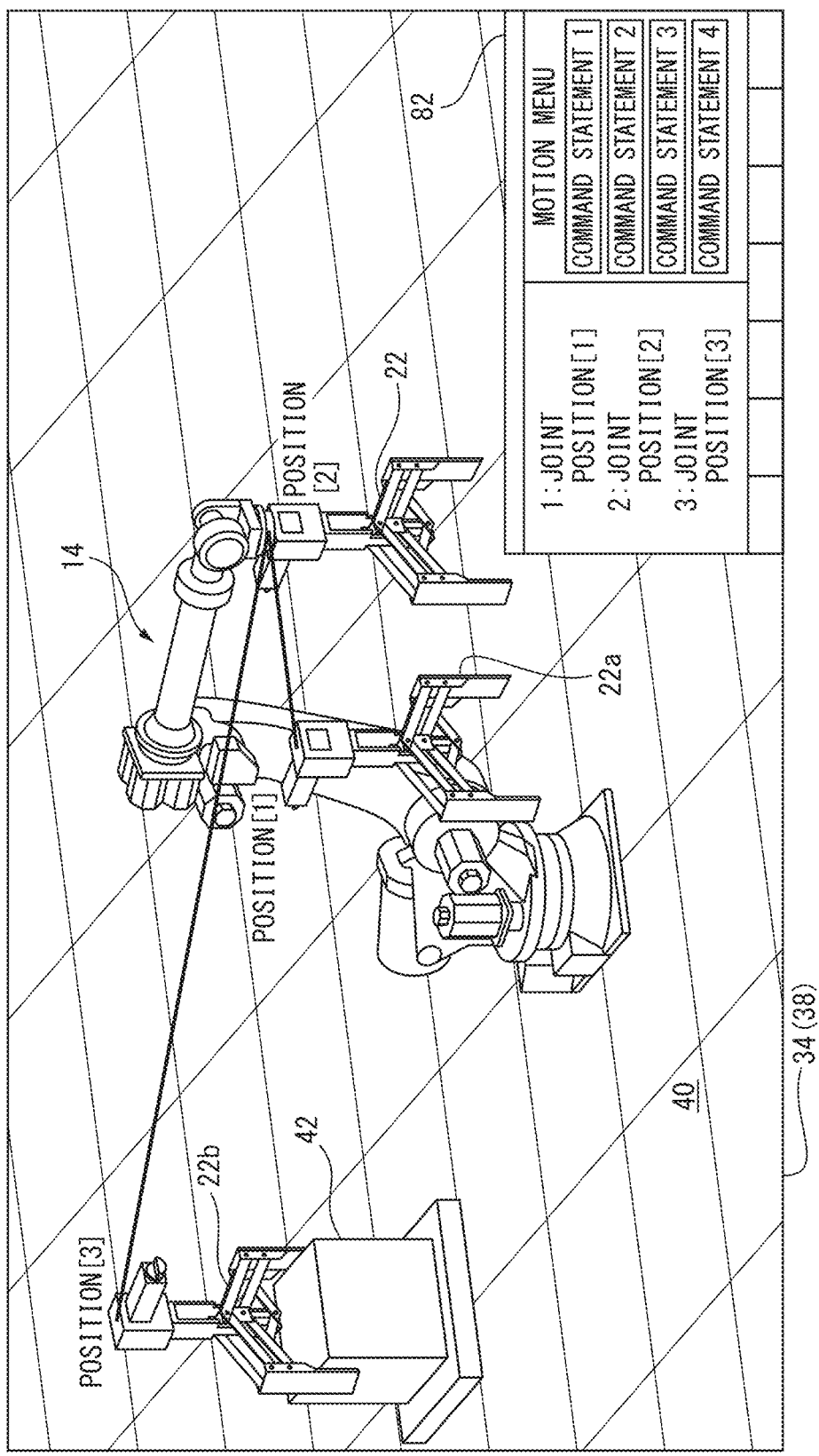
FIG. 12 shows a display example of the display device when a teaching point of the robot is set by using the position of the virtual model.

After virtual model 22a of the tool is moved to the desired position (e.g., the teaching point) by the above gesture motion, user 12 may perform the air-tap motion, etc., so that model selection menu 50 is switched to a program edit screen 82, as shown in FIG. 12. Similarly to menu 50, program edit screen 82 may be displayed on the user coordinate system fixed to the body of user 12, and user 12 can simultaneously look edit screen 82 and the actual environment.

User 12 operates model 22a by the above gesture motion or a gesture motion as explained below, so that model 22a moves to the position and orientation to teach. Then, user 12 specifies or teaches the position and orientation of robot 14 at this time (concretely, generates and sets a teaching point) by using program edit screen 82. In the example of FIG. 2, the motion of robot 14 can be taught from the position (position [1]) where hand 22 is represented by virtual image 22a to the position (position [3]) represented by virtual image 22b where hand 22 can grip workpiece 42, via the position (position [2]) of the actual hand.

The operation for teaching the position by using program edit screen 82 can be performed, for example, by selecting a motion command statement for the robot from the displayed motion menu. When user 12 selects the command statement, the position and orientation of the robot, where the position and orientation of the virtual model of the tool (hereinafter, referred to as the tool model) are matched to the actual position and orientation of the tool, are specified. Then, the specified position and orientation of the robot are taught (or stored in a proper memory) as a teaching point. For example, in the system where adsorption hand 54 holds and takes out workpiece 52 from box 58 as shown in FIG. 7, the teaching can be carried out by the following procedure.

(E1) Previously or at the work site, user 12 defines 3D work model 56 of workpiece 52. In this case, work model 56 is defined as a model which can involve workpiece 52.

(E2) Display controlling section 24 displays defined work model 56 so that the work model is overlapped with actual workpiece 52.

(E3) As shown in FIG. 7, display controlling section 24 projects the model of adsorption hand 54 in the actual world, and user 12 teaches the position and orientation of hand 54 to adsorb workpiece 52. Then, by display controlling section 24, the display device (or the AR-compatible display) can display the model of hand 54 on a model list, wherein the model of adsorption hand 54 at this time and model 56 defined by user 12 are positioned in a desired positional relationship, and also can display position numbers of teaching points (in this case, positions [1] to [3]). By virtue of this, robot controller 10 can visually and easily teach a conveyance path so that robot 14 does not interfere with peripherals, etc., without actually moving real robot 14. Further, in a system, wherein a conventional image-recognition technology and it is not necessary to teach which portion of the actual workpiece should be adsorbed or held, the user can define the model with respect to the center point of the hand, and add the defined model to the model list.

When the position and orientation of a robot having seven or more axes including an additional axis should be taught by using the position of the model, the user can designate the position of the additional axis. In this case, the model of the additional axis and the designated position can be displayed. For example, when the additional axis is attached to the sixth axis (or the end) of the robot and when the additional axis should be displayed, display controlling section 24 can change the position of the additional axis relative to the end, depending on the position of the additional axis designated by the user.

Next, position and orientation determining section 28 as described above judges whether (hand 22 of) robot 14 can actually reach each position of the moved virtual model, by using the operation of the virtual model operated by operation controlling section 26 and the positional relationship (as explained below) between robot 14 and display device 18 obtained by position and orientation obtaining section 20. Then, if it is judged that robot 14 can actually reach each position of the moved virtual model, position and orientation determining section 28 specifies the taught position (or the position and orientation of the robot) as a teaching point, and stores the teaching point in a memory, etc. Program generating section 30 may generate a robot motion program including the teaching point. The generated motion program may be used to teach the robot, or to execute a motion simulation for checking the motion of the robot or the possibility of interference, etc. In this example, each teaching point is determined, but a trajectory (or a sequence of points) including a plurality of teaching points may be taught. For example, when a trajectory obtained by dragging the 3D model in the space is determined as a sequence of teaching points, the motion of the robot can be taught as the trajectory.

For example, position and orientation determining section 28 execute the above judgment as follows.

As shown in FIG. 9, tool coordinate system 62 to be displayed on the tool model can be set for each tool model, i.e., a plurality of tool coordinate systems 62 may be set. The tool coordinate systems are defined on the basis of the positional relationship between each tool coordinate system and a coordinate system defined at the end of the robot. In menu 50 where the model list is displayed, the tool model is displayed with a number for defining the tool coordinate system thereof, since the tool coordinate system is defined with respect to each tool model. When the tool model defined with tool coordinate system 62 is projected in the real world, the position and orientation of the tool model on the reference coordinate system arbitrarily defined by the controlling section of the display device can be represented by using a matrix. In this regard, the position and orientation of the tool model on a world coordinate system arbitrarily defined by the controlling section (not shown) of the robot controller (i.e., the position and orientation of the tool coordinate system on the world coordinate system) can be represented by a product or multiplication of a conversion matrix A and a matrix B, wherein: conversion matrix A represents the position and orientation of the reference coordinate system on the world coordinate system, and is obtained by the positional relationship between the display device and the robot, and the relationship is obtained by position and orientation obtaining section 20; and matrix B represents the position and orientation of the tool model on the reference coordinate system. By solving inverse kinematics on the basis of the position and orientation of the tool model on the world coordinate system, position and orientation determining section 28 can calculate the position of each axis of the robot. Position and orientation determining section 28 can judge that, when the calculated position of each axis is within a motion restriction range of each axis defined for each robot, or a motion restriction range determined on the basis of a self-interference expression, the robot can actually reach the position of the virtual model.

When the reference coordinate system of the display device coincides with the world coordinate system (e.g., when the function of the controlling section of the robot controller and the function of the controlling section of the display device are integrated), position and orientation determining section 28 may calculate the position of each axis of the robot by solving the inverse kinematics on the basis of the position and orientation of the tool model, and judge whether the robot can actually reach each position of the moved virtual model.

In the above embodiment, although robot controller 10 teaches the position and orientation of the robot by using the position and orientation of the model, robot controller 10 may teach only one of the position and orientation of the robot. For example, the teaching point (or teaching information) including the position only can be used when it is not necessary to designate the orientation of the robot. In this case, the orientation of the teaching point can be determined by interpolation on the basis of the orientations of teaching points before and after the target teaching point. On the other hand, the teaching point (or teaching information) including the orientation only can be used, for example, to teach a specified orientation of the robot when the robot should hold the workpiece and locate the workpiece with the specified orientation, at an arbitrary place within an area having a predetermined volume.

In the above embodiment, the teaching is performed by using the model of the tool. In this regard, robot controller 10 may perform the teaching by using the entirety of the robot, the portion of the robot, the tool such as a welding gun or a sealing gun capable of being attached to the robot, or the work target to be processed or machined by the tool. In addition, as explained above, the work target may include the article used in the calibration operation of the robot (e.g., the article to which the movable part of the robot contacts during the calibration operation), as well as the article to be processed or machined, etc., by the robot. Further, the robot controller of the present disclosure may also be used to execute a simulation based on the motion program (e.g., checking of the operation of the robot or the occurrence of interference between the robot and the article, etc.), without actually moving the robot. For example, in the above embodiment, the position and orientation of the robot are specified by using the model, and the specified position and orientation are used to teach the program. Also, the robot controller may control the display device so that the image of the entirety of the virtual robot is displayed while being overlapped with the actual environment by using information including the specified position and orientation, and the robot controller may be used to check as to whether the robot interferes with the actual object.

In addition, the information including the specified position and orientation of the robot may be used for an application other than the teaching as in the embodiment.

Next, a concrete example of a configuration of position and orientation obtaining section 20 for obtaining (measuring) the positional relationship between robot 14 and display 18 will be explained. First, as a conventional example, a visual marker such as an AR marker (not shown) is attached to robot 14. Position and orientation obtaining section 20 can recognize (or process) the image obtained by capturing the marker by using camera 32 or 36 (FIG. 3 or 4) mounted on display device 18, and can calculate the positional relationship between the camera and the robot, by using the position, the orientation and the size of the marker on the image.

In the conventional example, it is necessary to previously arrange (e.g., attach or print) the marker on the robot. Therefore, when the robot is installed in a relatively polluted environment, etc., it is necessary to periodically clean the robot (at least the marker). Further, the user must operate the display device at a position where the display device can capture the marker, and thus the movable range of the user is limited. On the other hand, although the image of the robot can be used instead of the marker, it is necessary to obtain a plurality of images of the robot by capturing the robot in the different directions so as to identify the robot.

To the contrary, by using the display device of the present disclosure, the information generated by the computer can be displayed and overlapped with the actual environment or the actual image obtained by capturing the actual environment. In this case, position and orientation obtaining section 20 can identify the positional relationship between the display device and the robot, by using the 3D model of the robot displayed on the display device or the article attached to the robot, and by using a condition (or a parameter) when the 3D model of the robot or the article attached to the robot is overlapped with the actual robot or the actual article.

Hereinafter, examples (1-3) of the configuration for identifying the positional relationship between the display device and the robot will be explained. First, major terms used in the following explanation will be described. A "Robot control point" is a representative point used to control the motion of the robot, and a tool center point (TCP) is a preferred example thereof. A "world coordinate system" is a coordinate system defined for the robot, and the origin thereof corresponds to a reference position of the robot which is set on a base of the robot, etc. For example, the world coordinate system is indicated by a reference numeral 84 in FIG. 2, and fixed in the environment.

A "reference coordinate system" may be arbitrarily defined by the controlling section of the display device such as the AR-compatible display. For example, as indicated by a reference numeral 86 in FIG. 2, the reference coordinated system is fixed in the environment, having the origin which may correspond to the position of the camera (or the user) when the user starts the teaching operation, etc. (e.g., when the user initiates the display device). In detail, when the display device incorporates a 3D sensor, 3D data of the space including the user can be obtained, and the controlling section of the display device can determine where a 3D model of the hand, etc., should be displayed in the space. In such a case, the reference coordinate system as described above can be used as a reference for determining the position of the 3D space.

First Example

Figure 13:
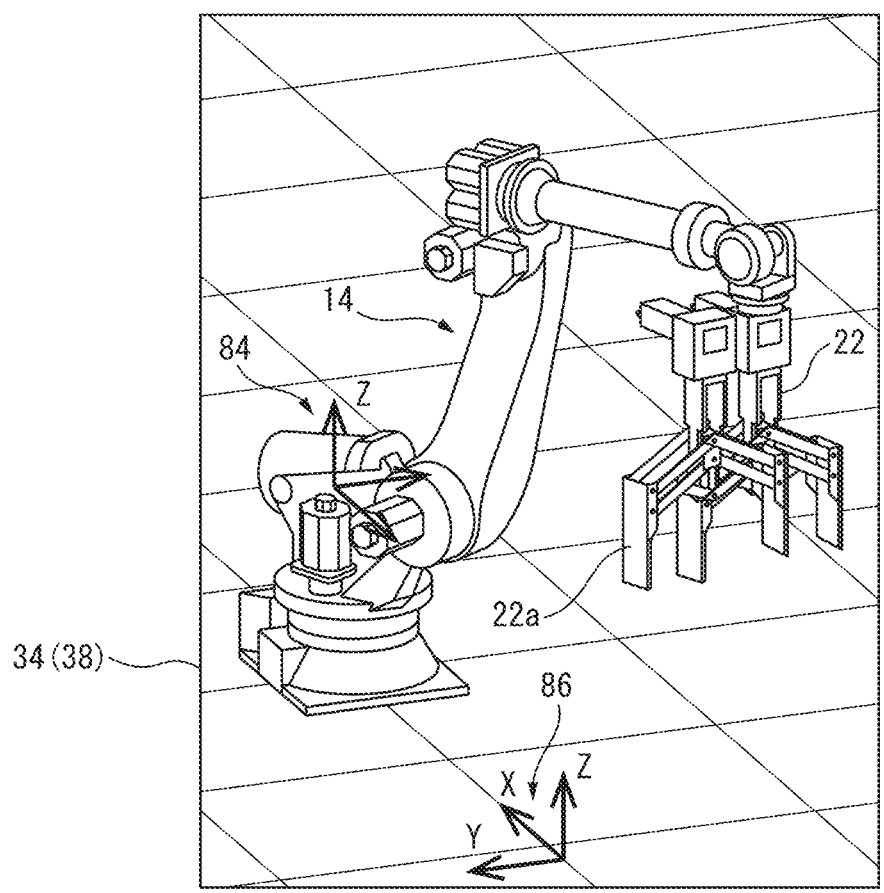
FIG. 13 shows an example of measuring a positional relationship between the robot and the display device.

FIG. 13 shows an image which user 12 looks through display device 18, and a state wherein virtual (3D) model 22a of hand 22 is overlapped with actual hand 22 of robot 14. Depending on the operation of user 12, the position and orientation of 3D model 22a on the reference coordinate system 86 are previously determined by the controlling section of display device 18, etc. On the other hand, depending on the operation of user 12 or the executed program, the position and orientation of the robot control point on the world coordinate system are previously determined by the controlling section for controlling the robot, etc. Therefore, when 3D model 22a of the tool (hand) is matched to actual tool 22 on display 34 of display device 18 by the operation of user 12, position and orientation obtaining section 20 can measure the positional relationship between robot 14 and display device 18, by the following procedure.

Display device 18 displays a model of a part of robot 14, such as a model of the end of robot 14 or a model of the tool such as hand 22a in FIG. 13. Then, according to user 12's performing the above gesture motion, operation controlling section 26 moves model 22a, so that user 12 can see that model 22a is matched to actual hand 22. At this time, the controlling section of display device 18 can calculate the position of the origin of robot 14 (world coordinate system 84), by receiving the position of each axis of robot 14 and information of the tool coordinate system, if needed, from the controlling section of robot 14. Due to this process, the controlling section of display device 18 can recognize the position of 3D model 22a as the actual position of tool 22 of robot 14. In addition, operation controlling section 26 can recognize the gesture performed by user 12, by executing template matching between the image captured by camera 32 or 36 and templates corresponding to various gestures, or by inputting the image to a discriminator (e.g., a discriminator based on a neural network) which has previously been taught so as to discriminate the gesture displayed on the image.

The controlling section of display device 18 can transmit information on the positional relationship between world coordinate system 84 and reference coordinate system 86 (e.g., a conversion matrix from world coordinate system 84 to reference coordinate system 86), and information on the positional relationship between reference coordinate system 86 and display device 18 (e.g., the position and orientation of display device 18 on reference coordinate system 86), to the controlling section of robot 14. Position and orientation obtaining section 20 can calculate the position of display device 18 on world coordinate system 84, by using the received information.

Herein, the term "overlap" and "match" means a state in which the position, the orientation and the size are all the same between the actual image and the virtual image, or a state in which the difference of each of the position, the orientation and the size between the actual image and the virtual image are within a predetermined error range (so that the user can see the both images as substantially single image). Further, such a state can be automatically discriminated by using the template matching, etc. Alternatively or additionally, when the user sees or recognizes the actual and virtual images as a substantially single image, the user may input that effect to the controlling section of the robot or the controlling section of the display device.

In the first example, the model of the part of the robot, such as the tool or the end of the robot, is displayed. In this regard, the model may be displayed together with a model of a work target (such as an article gripped by the robot hand, or an article to be processed by a gun attached to the robot, etc.) which exits in a motion range of the robot. In such a case, the user may move the model of the part of the robot or the tool attached to the robot, etc., so that the model of the work target matches the actual work target attached to the robot or the tool, etc.

Second Example

In the first example, with respect to the part of the robot, the virtual image is matched to the actual image or environment. On the other hand, in the second example, display device 18 displays a 3D model of the entire robot, and the user moves the 3D model so as to match it to the actual robot or overlap it with the actual robot. In this state, the controlling section of display device 18 can recognize the position (e.g., the origin) of the 3D model as the position where (the origin, etc., of) robot 14 is actually located. Further, position and orientation obtaining section 20 can calculate the position of display device 18 on world coordinate system 84, by a procedure similar to the procedure in the first example.

In this way, position and orientation obtaining section 20 can obtain the positional relationship between robot 14 and display device 18, by using the positional relationship between world coordinate system 84 and reference coordinate system 86, and using the position of the virtual image (model) on display device 18 when the actual image and the virtual image displayed on display device 18 are matched to each other. Preferably, display device 18 has a sensor such as a 3D sensor, configured to measure at least one of the position and orientation of display device 18 relative to reference coordinate system 86. In the first and second examples, the robot controller operates or moves the virtual model so that the virtual model is matched to the actual object. Alternatively, the actual robot may be operated or moved so that the actual object is matched to the virtual model. Also, by a procedure similar to the above procedure, position and orientation obtaining section 20 can obtain the positional relationship between robot 14 and display device 18, by using the actual position and orientation of the object, when the virtual model is matched to the object included in the actual environment or the object represented on the actual image. In addition, if needed, position and orientation obtaining section 20 may obtain only one of the position and orientation of display device 18 relative to robot 14.

Third Example

In the first and second examples, with respect to one position, the virtual image of the entire or part of the robot is matched to the actual image or environment. Alternatively, the operation may be performed at a plurality of positions to average errors at the positions, whereby an accuracy of the operation can be increased. As a concrete method therefor, a three-points teaching method for teaching a coordinate system to the robot (as explained below), or a four-points teaching method may be used.

In the three-points teaching method, first, at an arbitrary first position, virtual model 22a is matched to hand 22 of actual robot 14, by the operation of the user. Then, by a procedure similar to the first example, the positional relationship between the robot and the display device is stored in the controlling section of the display device. Next, robot controller 10 moves (hand 22 of) actual robot 14 from the first position to a second position which is separated from the first position by an arbitrary distance in the X-direction of world coordinate system 84. Then, similarly to the above, virtual model 22a is matched to hand 22 of actual robot 14 by the operation of the user, and the positional relationship between the robot and the display device is stored in the controlling section of the display device. Finally, robot controller 10 moves (hand 22 of) actual robot 14 from the second position to a third position which is separated from the second position by an arbitrary distance in the Y-direction of world coordinate system 84. Then, similarly to the above, virtual model 22a is matched to hand 22 by the operation of the user, and the positional relationship between the robot and the display device is stored in the controlling section of the display device. By averaging the plurality of relative positions obtained by the above procedure, etc., position and orientation obtaining section 20 can calculate a more accurate positional relationship between world coordinate system 84 and reference coordinate system 86. In the third example, the similar result can be obtained, if the controlling section of the display device is replaced with the controlling section of the robot, and the world coordinate system is replaced with the reference coordinate system. The four-points teaching method, which has been used to set a tool coordinate system for the robot, may also be used.

In the first, second and third examples, the positional relationship between the actual robot and the display device (such as the AR-compatible display) can be obtained with high accuracy, and moreover, a workload for maintenance and/or a processing time can be significantly reduced, in comparison to a conventional image recognition method. In each example as described above, each of the robot and the display device has the controlling section, in conjunction with the positional relationship between the world coordinate system and the reference coordinate system. However, substantially one controlling section, having the functions of both the above two controlling sections, may be provided to the robot or the display device. Alternatively, the substantially one controlling section may be provided to another separate device such as a personal computer. The operation of the model in each example as described above may be performed by using the gesture, a touch panel, a pointing device such as a joy pad or a joy stick used to operate a game machine, or a teach pendant, etc.

Meanwhile, during the user performs the operation such as the gesture motion or teaching as described above, the user may move relative to the actual robot irrespective of whether on purpose or not, whereby the positional relationship between the robot and the display device may be changed. Further, in case that the robot is mounted on a movable carriage, etc., the robot may be moved relative to the user, even when the user does not move. In such a case, it may be necessary to measure the positional relationship between the display device and the robot again.

Therefore, it is preferable that at least one of the robot and the display device is provided with a tracking unit configured to track and calculate the relative position and orientation between the robot and the display device. By virtue of this, even when the positional relationship between the user (or the display device) and the robot is changed, the model displayed in (overlapped with) the actual environment can be properly moved depending on an amount of the movement. For example, a sensor using a light such as a laser beam or an infrared light, an ultrasonic sensor, a magnetic sensor, an inertia sensor or a gyro sensor may be used as the tracking unit (e.g., see reference numeral 67 (FIG. 3) or 69 (FIG. 4) of display device 18), and the tracking unit may be provided to at least of the robot and the display device. Due to this, when the positional relationship between the display device and the robot is changed, the accurate positional relationship can be obtained without measuring the positional relationship again.

In case that the robot is mounted on the carriage and the above tracking unit is provided to the carriage, after the positional relationship between the display device and the robot is measured once, the positional relationship can be obtained even when the robot is moved. Therefore, it can be properly judged whether the actual robot can reach the taught position. Further, when the 3D model of the robot should be displayed in the motion simulation of the robot, the motion of the 3D model can be correctly displayed. Instead of using the carriage, the robot may be mounted on a rail or a rotating circular plate driven by a servomotor, etc., by which an amount of movement of the rail or the plate can be obtained. In this case, a means (such as an encoder) for detecting the amount of movement can be used as the tracking unit.

Although the head-mounted display is used as the display device in the above embodiment, it is obvious that the same operation and procedure can be applied to when a tablet terminal is used instead.

Although the robot having six or seven axes is used in the above embodiment, the number of axes of the robot is not limited as such. Therefore, the robot controller of the present disclosure may also control a robot having a plurality of (other than six or seven) axes.

The above embodiment utilizes the augmented reality and the mixed reality, and the user operates (moves or rotates) the virtual model overlapped with the actual environment by the gesture motion, whereby the user can teach the robot while feeling as if the user were moving the actual robot or object. Therefore, the user can quickly and intuitively perform the operation such as the teaching, etc. Further, since it is not necessary to previously generating a model of the workpiece or peripherals, etc., existing around the robot, a workload can be reduced relative to the virtual reality, and further, the accuracy and reliability of the teaching and the simulation can be improved. Moreover, it is not necessary for the user to hold the actual object such as the teach pendant or the robot body, and move the actual robot by the hand or the jog motion, etc. Therefore, the robot controller of the present disclosure can reduce the burden and fatigue of the user, the operation time, and energy cost.

According to the present disclosure, the displayed virtual model of the robot, overlapped with the actual environment, is moved on the basis of the motion of the user, without moving the actual robot. Therefore, the user can intuitively perform the operation such as the teaching, while feeling as if the user were moving the actual robot.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller, comprising:
   a processor configured to
      obtain relative position and orientation between a display device and a robot included in an actual environment;
      control the display device so that the display device displays a virtual model of at least one object of the robot, a movable part of the robot, an article supported by the movable part, and a work target of the movable part;
      operate, at a speed displayed with the virtual model, the virtual model in response to a user's manipulation of a button which indicates a direction of movement of the virtual model and which is displayed in a space near the virtual model; and
      determine at least one of the position and orientation of the robot by using at least one of the position and orientation of the virtual model operated by the processor, and using the relative position and orientation obtained by the processor,
   wherein the virtual model selected and dragged from an image representing a list or menu of virtual models for only the robot toward which the display device is directed by the user is displayed on the display device at a specified position in the actual environment or an actual image obtained by capturing the actual environment.

2. The robot controller as set forth in claim 1, wherein the display device is a head-mounted display device or a mobile terminal, which has a camera configured to capture the actual environment, and a display configured to display an actual image obtained by the camera by capturing the actual environment in real time.

3. The robot controller as set forth in claim 1, wherein the display device is a head-mounted display device having a transmissive display.

4. The robot controller as set forth in claim 1, wherein the processor is configured to
judge whether or not the robot can actually reach at least one of the position and orientation of the robot designated by at least one of the position and orientation of the virtual model operated by the processor by using at least one of the position and orientation of the virtual model and using the relative position and orientation obtained by the processor, and
determine at least one of the position and orientation of the robot by using at least one of the position and orientation of the virtual model in a case where the robot can actually reach at least one of the designated position and orientation of the robot.

5. The robot controller as set forth in claim 1, wherein the processor is further configured to generate a motion program of the robot by using at least one of the position and orientation of the robot determined by the processor.

6. The robot controller as set forth in claim 1, wherein at least one of the robot and the display device is provided with a tracking unit configured to track and calculate the relative position and orientation.

7. The robot controller as set forth in claim 1, wherein the display device is configured to display information generated by a computer so that the information is overlapped with the actual environment or the actual image obtained by capturing the actual environment.

8. The robot controller as set forth in claim 1, wherein the virtual model is displayed with information that represents a tool coordinate system.

9. The robot controller as set forth in claim 1, wherein after a positional relationship between the movable part and the article supported by the movable part or the work target of the movable part is determined by the processor, the virtual model placed in the positional relationship is displayed in the image representing the list or menu of virtual models.

10. The robot controller as set forth in claim 9, wherein after a positional relationship between
(1) the movable part and
(2) (a) the article supported by the movable part or (b) the work target of the movable part projected in the actual environment
is determined by the user,
the virtual model placed in the positional relationship is displayed in the image representing the list or menu of virtual models.

11. The robot controller as set forth in claim 1, wherein the virtual model defined by the user in the actual environment as a model which can involve the actual object in the actual environment is displayed in the image representing the list or menu of virtual models.

12. The robot controller as set forth in claim 1, wherein the user's manipulation of the virtual model includes at least one of (a) a gesture motion of the user or (b) turning of the user's gaze on the virtual model, and
the size of the virtual model is automatically changed depending on the position where the virtual model is placed in response to the user's manipulation of the button.

13. A robot controller, comprising:
a processor configured to
control a display device so that the display device displays a virtual model of at least one object of a robot included in an actual environment, a movable part of the robot, an article supported by the movable part, and a work target of the movable part;
operate, at a speed displayed with the virtual model, the virtual model in response to a user's manipulation of a button which indicates a direction of movement of the virtual model and which is displayed in a space near the virtual model; and
obtain at least one of relative position and orientation between the robot and the display device
by using at least one of the position and orientation of the object included in the actual environment in a case where the object included in the actual environment and the virtual model displayed on the display device are matched to each other, or the object and the virtual model represented in an actual image which is obtained by capturing the actual environment and displayed on the display device are matched to each other, or
by using at least one of the position and orientation of the virtual model displayed on the display device in a case where the object included in the actual environment and the virtual model displayed on the display device are matched to each other, or the object and the virtual model represented in the actual image on the display device are matched to each other,
wherein the virtual model selected and dragged from an image representing a list or menu of virtual models for only the robot toward which the display device is directed by the user is displayed on the display device at a specified position in the actual environment or the actual image obtained by capturing the actual environment.

14. The robot controller as set forth in claim 13, wherein the processor is configured to obtain at least one of the relative position and orientation between the robot and the display device by further using a positional relationship between a coordinate system defined for the robot and a coordinate system defined for the display device.

15. The robot controller as set forth in claim 13, wherein the display device is configured to display information generated by a computer so that the information is overlapped with the actual environment or the actual image obtained by capturing the actual environment.

16. A display device, comprising:
a display; and
a processor configured to
obtain relative position and orientation between the display and a robot included in an actual environment;
control the display so that the display displays a virtual model of at least one object of the robot, a movable part of the robot, an article supported by the movable part, and a work target of the movable part;
operate, at a speed displayed with the virtual model, the virtual model in response to a user's manipulation of a button which indicates a direction of movement of the virtual model and which is displayed in a space near the virtual model; and
determine at least one of the position and orientation of the robot by using at least one of the position and orientation of the virtual model operated by the processor, and using the relative position and orientation obtained by the processor, wherein the virtual model selected and dragged from an image representing a list or menu of virtual models for only the robot toward which the display device is directed by the user is displayed on the display device at a specified position in the actual environment or an actual image obtained by capturing the actual environment.

17. A display device, comprising:

a display; and a processor configured to control the display so that the display displays a virtual model of at least one object of a robot included in an actual environment, a movable part of the robot, an article supported by the movable part, and a work target of the movable part;

operate, at a speed displayed with the virtual model, the virtual model in response to a user's manipulation of a button which indicates a direction of movement of the virtual model and which is displayed in a space near the virtual model; and obtain at least one of relative position and orientation between the robot and the display by using at least one of the position and orientation of the object included in the actual environment in a case where the object included in the actual environment and the virtual model displayed on the display are matched to each other, or the object and the virtual model represented in an actual image which is obtained by capturing the actual environment and displayed on the display are matched to each other, or by using at least one of the position and orientation of the virtual model displayed on the display in a case where the object included in the actual environment and the virtual model displayed on the display are matched to each other, or the object and the virtual model represented in the actual image on the display are matched to each other, wherein the virtual model selected and dragged from an image representing a list or menu of virtual models for only the robot toward which the display device is directed by the user is displayed on the display device at a specified position in the actual environment or the actual image obtained by capturing the actual environment.

* * * * *